T. Lindsley.
Oar.
N° 1,997.
33,001.
Patented Aug 6, 1861.
Sheet 2. 2 Sheets.
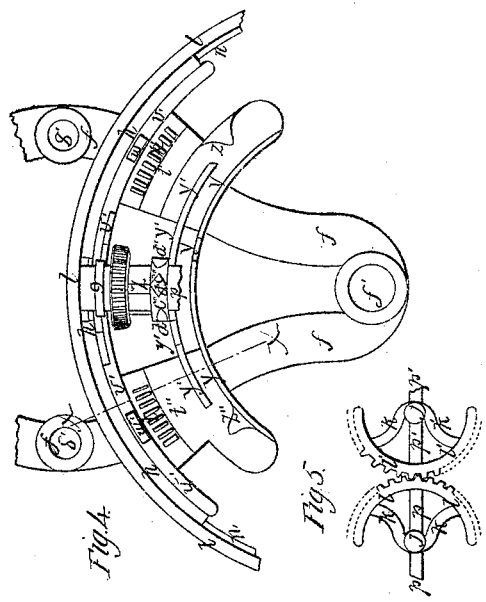
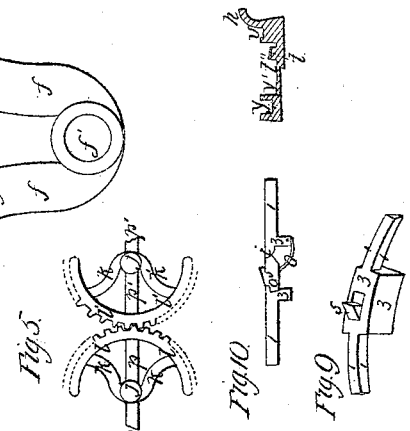
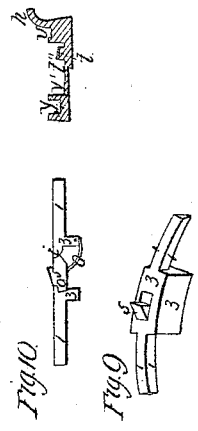
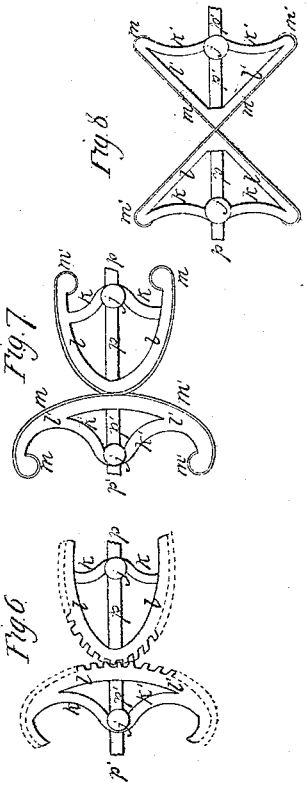
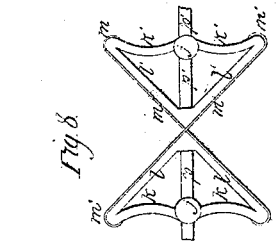
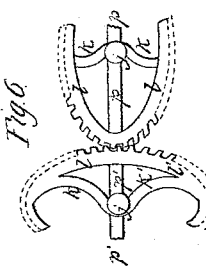
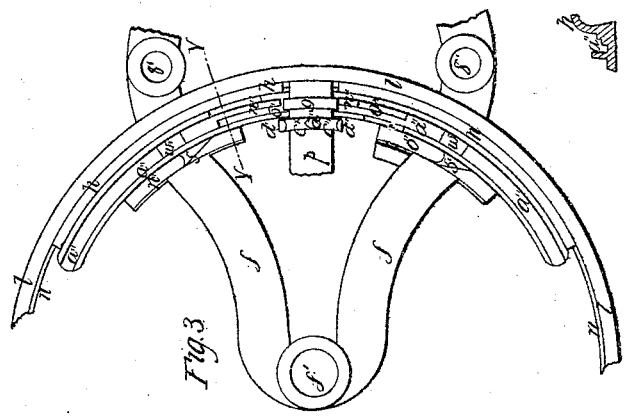
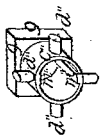
Witnesses:
Chas. F. Church
Catharine Person
Inventor:
Thales Lindsley

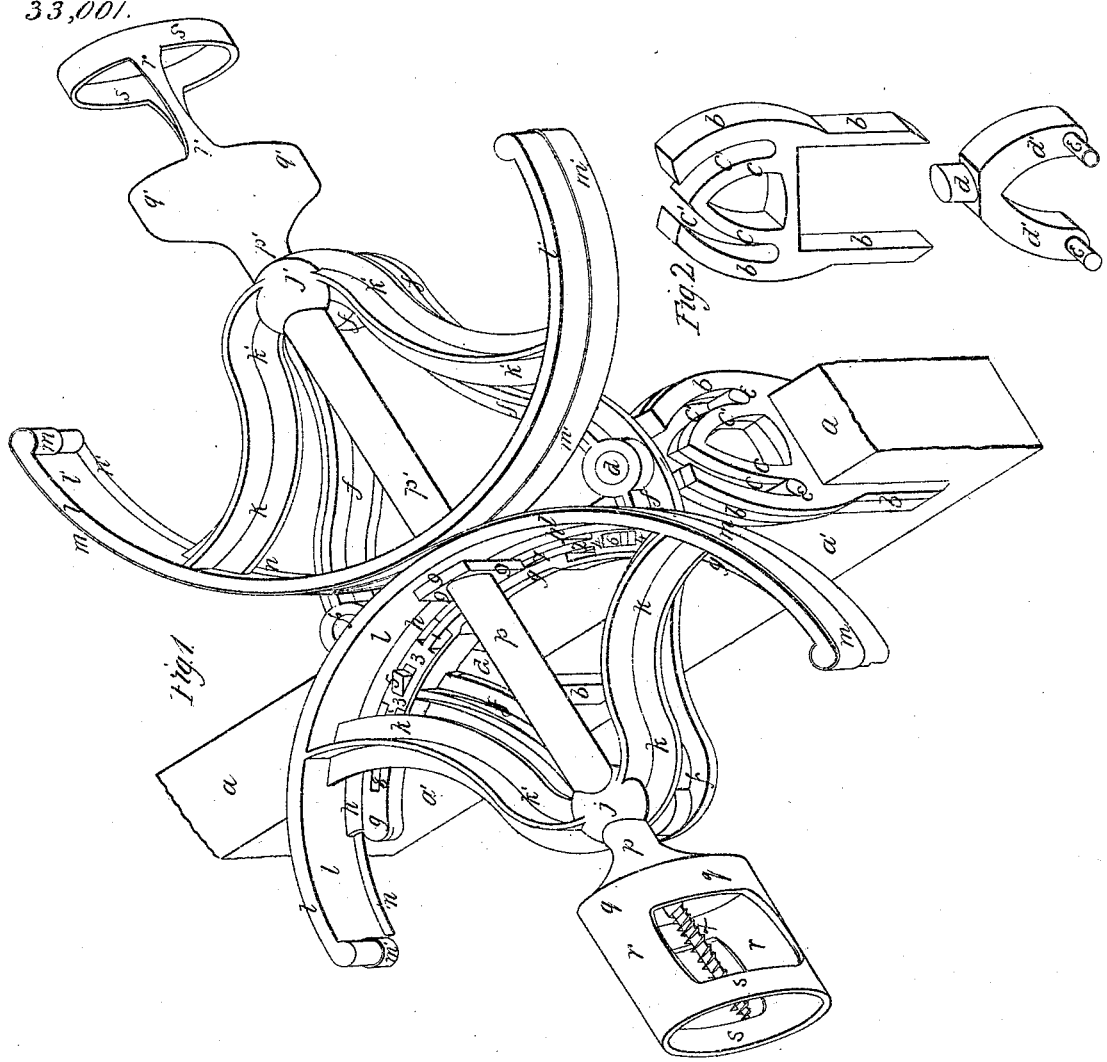

UNITED STATES PATENT OFFICE.

THALES LINDSLEY, OF MOLINE, ILLINOIS.

IMPROVED OAR.

Specification forming part of Letters Patent No. 33,001, dated August 6, 1861.

*To all whom it may concern:*

Be it known that I, THALES LINDSLEY, of Moline, Rock Island county, Illinois, have invented new and useful Improvements in Oars; and I do hereby declare that the following is a full, clear, and exact description of the construction, functions, and operation of the same, reference being had to the annexed drawings, making part of this specification, in which—

Figure 1 is a perspective view of the improvements claimed in one form; Fig. 2, of that part of the oar denominated its "hinge;" Fig. 3, a plan of the third class of feathering apparatus with view of equilateral and guide; Fig. 4, a plan of second class of feathering apparatus; Figs. 5 and 6, plans of the circular and elliptical segments, respectively, operated by cogs; Figs. 7 and 8, plans of the elliptical and square segments, respectively, working by "bands." Fig. 9 is a perspective of the dogway and dog represented in Fig. 1; Fig. 10, a vertical section of the dogway and dog of Fig. 9.

The nature of my invention consists in dividing the loom into two levers with independent fulcra and so connecting and adjusting them as to secure, among other results, the following, viz: first, movement of the levers in the same plane, but in opposite directions; second, the feathering and unfeathering of the oar at every stroke; third, shipping and unshipping the oar by a single motion in a right line; fourth, enabling the levers to assume a parallelism with respect to each other—in other words, to fold up in or out of the boat and along the gunwale, and, fifth, so constructing the essential parts that each upon being damaged can be repaired without the loss of another.

To enable others skilled in the art to make the oar herein delineated, and which I denominate the "Amateur" to contradistinguish it from my "Reaction" and "Recruit," I proceed to describe its construction, interpolating such remarks as circumstances seem to warrant.

There are six general constituents to the oar, exclusive of the blade and handle, and we shall consider them in order.

THE HINGE.

The first to which I call attention is that which I name the "hinge." It is very well represented in Fig. 1, where it is seated in place on the gunwale $a\ a\ a'\ a'$, but better in Fig. 2, where the parts are detached and presented in perspective. The drawing Fig. 2 is so clear and full that it is only necessary to add that $d$ illustrates the screw or shaft which unites it to the frames $ff$ and $c'\ c'$, the slotted eyes or thimbles for the journals or hooks $e\ e$. The rule for determining the outline of $b, b'$, and $c$ is the following: Draw the center of each eye at a distance apart precisely equal to the width of the gunwale. From either of these as a center describe the path of the slot of the other. The height of the external wall $b'\ b'$ of the ear is measured by the same radius, minus half the diameter of the eye. The convex wedge $c\ c$, whose base is in line with the eyes, though retained, is not regarded as indispensable to the operation of the hinge.

FRAME.

The next constituent to which I call attention is the frame $fff$, whose form and position are sufficiently shown in Fig. 1. Fig. 4 gives the plan of it in major part. The functions are, however, not apparent, which are the following, viz: First, it receives and holds at $8'\ 8'$ the shanks or screws $d\ d'$ of the hinge, and thus connects that constituent with the rest of the oar; second, it receives and holds at $f'\ f'$ the fulcra or hubs $j\ j'$ of the segments—that is, their pivots or axles; third, it bears the carriage-way $g\ g\ g$ on the one hand and the correspondent shoulder of $h\ h$, (seen in Fig. 1;) fourth, it sustains all the mechanism incumbent and furnishes the facilities for preserving the ways and segments in the same plane.

LOOM.

The third constituent to which I call attention is the division of the loom into two levers with independent fulcra. Fig. 1 illustrates so much of each of these levers as is deemed necessary for my present purpose. Each of these divisions of the loom is best made of two parts, the one of wood (not represented) the other of metal. The metallic portions of each are respectively presented by the shaft $p\ p$ and socket $q\ r\ s\ x$ for the loom-lever and by $p'\ p'$ and socket $q'\ r'\ s'$ for the handle-lever.

LEVER.

The fourth constituent to which I call attention are the media through which the levers act upon each other—that is to say, $p\ p$ from its fulcrum $j$ acts upon $p'\ p'$, having its fulcrum at $j'$, Fig. 1. These media are in general terms five. The mathematical forms which they illustrate or from which they are derived are the circle, the ellipse, the parabola, the hyperbola, and the square. Of these forms nothing but segments or parts, as seen, for the first two and the last, in Figs. 1, 5, 6, 7, and 8 are really necessary or are used. Thus of the circle, half or less than half; of the ellipse, half or more, and of the square, of the same. In Fig. 1 the segment is circular, in which $l\ l\ l$ is the rim, $k\ k\ k$ the arms, and $j$ the fulcrum or hub of the lever $p\ p$, and $l'\ l'\ l'$ the rim, $k'\ k'\ k'$ the arms, and $j'$ the hub of the lever $p'\ p'$. Like letters indicate like parts in Figs. 5, 6, 7, and 8. The fulcra or hubs are spherical in form, as drawn, and in the shape of journals descend through the frame $f\ f$, with nuts as termini. The levers $p\ p$ and $p'\ p'$, as shown, pass through the center of these fulcra, enter the rims $l\ l$ and $l'\ l'$ and revolve therein. $n\ n$ and $n'\ n'$ are shoulders upon the rim of the segments which work under and with the flange $h\ h$ and $h'\ h'$, (not seen,) and which hold the segment fast in place. Friction-rollers and other gearing can be made to meet the same end.

SEGMENTARY CONNECTIONS.

The fifth constituent to which I call attention are the modes or means by which the segments of the same kind act upon each other—that is to say, a circular segment upon a circular, an elliptical upon an elliptical, &c. These modes are practically reducible to two general classes, which may be denominated "cogs" and "bands," the word "bands" including straps, cords, chains, &c., of metal or other suitable material.

*Bands:* Of these two general modes I shall first speak of bands, which mode is illustrated in Figs. 1, 7, and 8 by the letters $m$ and $m'$. Two bands are usually employed, one for the upper and one for the lower half of the corresponding segments. Three or more can be used, if caprice demands them. Each band, when the levers are in line, as shown in the drawings, lies half upon one and half upon the other segment. They are drawn tense by screws at the extremities of the arcs of the segments or by other sufficient keys. The whole five segments admit the practical use of the band-connection.

*Cogs:* The cog is adapted to two kinds of segments, the circular and elliptical, as seen in Figs. 5 and 6.

REMARKS.

First. The hinge, frame, levers, and segments, constructed as detailed, constitute a reaction oar in the stricter sense. The oarsman in using it sits with his face to the point of destination.

Second. The oar represented in the drawings is the starboard seen from the bow. The larboard, with the constituents enumerated in first remark, is the same; but with the introduction of feathering apparatus it is not, as will be hereinafter seen.

Third. The oar, consisting of the parts stated in first remark, is not capable of being either feathered or unfeathered, but is usable when $p\ p$ and $p'\ p'$ are fixed in their fulcra and prevented from revolving.

Fourth. The rim of the segments, when geared by bands, should have a delicate flange to prevent the band from being "thrown" by any force less than a breaking one. When cords or chains are employed, the faces of the segments should be grooved for the same reason.

Fifth. When conic segments are adopted, the transverse axis of the oar is arranged perpendicular to the conjugate axis of the other, &c.

Sixth. When the parabolic or hyperbolic forms are used, three equal sections of the same class must be taken, one of them to represent $l\ l$, Fig. 7, and half of two to represent $l'\ l'$, same figure.

Seventh. The hinge-frame and feathering apparatus, as may be seen, are so constructed and adjusted that any of the five forms of segment can be removed from or attached to the loom-lever $p\ p$ and its correspondent $p'\ p'$ in a moment, thus rendering the oar capable of taking five forms in its segmentary connections and of enabling the oarsman with a common hinge-frame and levers to change the style of his oar in subordination to his caprices or necessities.

Eighth. Whenever the word "segment" is used in my claims it is to be taken to include the five segmentary media prescribed and their derivatives.

Ninth. Whenever the word "modes" is used in the same relation it is to be taken to include cogs and bands with their derivatives. The word "derivatives" is construed to signify equivalents—*e. g.*, instead of the rim of the circular segment, spokes can be used, &c.

FEATHERING APPARATUS.

I have now advanced far enough in the enumeration and description of the constituents of the amateur to call attention to the sixth and last general constituent of my oar. This is characterized as the feathering and unfeathering gear. It is a constituent of my series of oars—the Amateur, Reaction, and Recruit.

Four elements should be sought and combined in a feathering and unfeathering constituent: first, that it be capable of adapting its operation to the stroke desired, whether long or short; second, that it perform its functions with certainty and exactness under all circumstances; third, that it feather and unfeather on return and not on stroke of the oar; fourth, that it turn the loom and of course the blade without shock to the mechanism or hand; and perhaps a fifth should be added—viz., fifth, that it do not allow the blade to feather when it should be unfeathered, and vice versa.

The feathering apparatus consists of two general parts, to wit: what may be called a "tumbler" with its appurtenances as represented by $q\ q\ q$, Fig. 1, $z\ z'$, Fig. 4, &c., and what may be called a "carriage-way" with its appurtenances, as seen by $g\ g$, Fig. 1, &c., to be hereinafter described. The former is located upon the shaft $p\ p$ of the loom-lever, the latter upon the frame $f\ f\ f$. Each is removable and adjustable at will by set-screws or keys. (Not visible in the drawings.) Of the "tumblers," so called, there are four species, viz., the first consisting of an equilateral only, as $q\ q\ q$, Fig. 1; the second consisting of an equilateral, as $q\ q\ q$, and of a segmentary pinion, as $z\ z'$, Fig. 4, the third consisting of two (or the equivalent of two) equilaterals, as shown in Fig. 3, with its perspective, and the fourth consisting of an equilateral and an inseparable guide. Of the carriage-ways there are two classes, viz., the first consisting of a way proper, with two slotted dogways and two dogs, as seen in Fig. 1, the second consisting of a way proper, divisible in half and extendible (seen in Fig. 3 and its cross-section) with slots and dogs or with racks for tripping the tumbler, as hereinafter described. The first species of tumbler belongs to the first class of feathering-gear exclusively, the second to the second class, and the third to the third class, and so on. The first kind of carriage-way belongs exclusively to the first species of tumbler, the second to the first, second, third, and fourth.

The first class of feathering-gear is presented in Figs. 1, 9, and 10. It consists of a carriage-way $g\ g\ g$ for the equilateral or tumblers $q\ q\ q$ to ride on, of two dogways 1 1 3 3 and 2 2 4 4 and their dogs 5 and 6, and, lastly, of the equilateral aforesaid and the flange $h\ h$.

The carriage-way $g\ g$ is beveled into its arms and held in position by set-screws from beneath the arms. This mode of construction is the preferred one and is common to each class of feathering apparatus. On the outer verge of the way rises and projects a concave flange $h\ h$, which works with the convex one $n\ n$ of the rim $l\ l$, keeps the segment in place during its vibrations, and relieves the strain on the fulcrum $j$. The dogways 1 1, &c., and 2 2, &c., rest on and slide in (to and fro) the carriage-way. Their peculiar construction is exhibited in Figs. 9 and 10. They are held in place by set-screws entering through the side of the carriage-way. The special end subserved by these ways is this: to enable the oarsman to adjust the feathering (tripping of the equilateral) and unfeathering of the blade to his stroke. By unsetting these dogways and moving them from the center of the carriage-way the time of tripping is lengthened, and of course the stroke may be. By moving them toward the center of the carriage-way the time is shortened, and so the stroke. The dogs 5 and 6 play in their chambers within the dogways, as seen in Fig. 10. They are so formed, as a glance reveals, as to escape any liability to displacement. Both ends of them—$i$ and $o$—are curved and work in curves corresponding with the paths of their motion. The dogs are kept from pulling out and in place at all times by the spring $o'$ or by fulcra.

The equilateral or square $q\ q\ q$ is a constituent separate from the loom-lever $p\ p$ in main feature, but united with it in labor by suitable keys. Its best form is correctly shown in the drawings, and its functions are the following, viz:

First. To hold the loom (and blade) in rigid position, whether feathered or unfeathered, for the time and distance required.

Second. To turn the loom (and blade) one-fourth round when tripped by a dog, and itself forward a side, no more, no less. The dog chamber or slot, when a tooth encounters the equilateral $q\ q\ q$, receives the advancing corner of the same, and thus enables the square to do what it is compelled to perform, to wit, roll forward a side, and thus and thereby either feather or unfeather the oar, as the case may be.

Third. To retain in place the loom-lever $p\ p$ and prevent its escape from the rim or through the hub $j$. The carriage and dog ways for this purpose have a groove precisely fitted for a side of the "square" $q\ q\ q$ occupying the path of it. The equilateral in traversing this groove holds the lever $p\ p$ to its work and forbids its withdrawal from the rim. This groove is not represented in Fig. 1, nor is the square, as enlarged, to sl.de in it, though this groove is a common but not necessary feature of each class of my feathering apparatus. The object aimed at in the introduction of the groove is to dispense with the necessity of retaining the end of the lever aforesaid in the rim $l\ l$ by means of a screw-journal, which passes through the rim and enters (and screws into) the end of the loom end mentioned. The other form of the equilateral or square is a derivative of it, and consists simply in hollowing out its sides, so as to convert the square into a species of four-cogged wheel. This operates well, but is not equal to its original, and besides calls for a size considerably larger than the equilateral proper.

The dogways can be dispensed with in the first class of feathering-gear by dividing the carriage-way, as in second and third classes, into two parts united by interlapping or scarfing, as in Figs. 3 and 4.

The second class of feathering-gear is presented in Fig. 4. It differs from the first chiefly in the introduction of a pinion, two racks, a guide, a guide-truck, and divisible extendible carriage-way, and from the absence of the dogways and dogs. The equilateral, however, performs here its first and third functions only. The second—that of turning the loom so as to feather and unfeather it—is transferred to the pinion and its racks. The racks $t$ and $x'$, into which the pinion $z'$ meshes, sustain nearly the same relation to the pinion that the dogs do to the equilateral in the first class. They occupy the position, with respect to distance from the center of the carriage, that the dogs do, and, like them, are adjustable to any length of stroke desired. What in the first class was only incidentally noticed, in this becomes a necessity. I refer to the construction of the carriage-way in two general parts interlapping and dovetailing, as it were, each other. Thus in Fig. 3, $a''\ a''\ n''\ n''$ represent one half, and $a''\ a''\ o''\ o''$ the other, of the way. In order that the racks may approach or recede from each other, as the whims of the oarsman shall demand, the extension and contraction of the way are imperative.

The peculiar manner in which the carriage-way is made compound and capable of extension and contraction in length is better understood by the cross-section of it represented. In this cut it will be observed, first, that the parts so interpose that the equilateral never wholly loses its foothold, and, second, that the guide has a continuous wall along which to travel around its circuit.

The equilateral is keyed on the loom-arm and is independent of the pinion. The pinion and guide are parts of the same metallic piece, being connected by four light staves or a thin cylinder. The loom-lever is grooved to receive them, and on the inside of the cylinder are longitudinal convexities $m''\ m''$, just fitted for these grooves. The pinion and guide-wheel slide onto the lever, and when in place have an easy longitudinal motion of a little more than the thickness of the pinion. The reason of this longitudinal movement will be apparent when the functions of the guide-wheel $c''\ d''$ are specified.

The pinion, as before stated, meshes into the racks $t\ x'$. These racks are in length somewhat less than one-fourth the circumference of the pinion. It is not necessary to construct them a full quarter, because the equilateral, upon dipping into its slot, must cause a quarter-revolution, and that in spite of the pinion. Hence, as will be seen in the third class of feathering-gear, I dispense with the pinion and supply its place with a dogged guide $5'\ 6'$ and $c''\ c''\ d''\ d''$, Figs. 3 and 4, perspective view, also.

The guide $c''\ c''$ of itself is nothing but a flat ring with four arms like long cogs projecting from it. These arms here have but one function, that of throwing the pinion in and out of gear. The ends of the arms respectively pass along the grooves $y\ y$ and $y'\ y'$, Fig. 4, one at a time, and by so doing first throw the pinion out and then in gear, the former to prevent contact with the racks, and consequently feathering of the oar on stroke, the latter to secure said contact, and consequently feathering and also unfeathering, by the quarter forward revolution from each rack. The manner in which an arm of the guide throws the pinion out or in gear is this: When it passes the rack $x'$ and when the pinion has meshed with it, the arm encounters the curved shoulders $z$ and is driven out of line into the groove $y\ y$, and thence forward to or beyond the carriage-way. As it obliques from one groove to the other, being inseparable from the pinion $z'$, the latter is drawn out of gear, so that when the arm returns in the groove $y\ y$ (which it will) the pinion passes within the line of its racks; but, however, when the arm passes the other rack, the curved shoulder $z''$, the alternate of $z$, drives it back into the first groove $y'\ y'$ and carries the pinion into line with its racks, ready to feather and unfeather the oar. The grooves of this carriage-way are three, one $v'\ v'$ for the equilateral $q\ q$, in which the slots $w'\ w$ occur for the turning of the same, another $y'\ y'$ for the arms $d''\ d''$ of the guide or tripping wheel $c''\ c''$ (see view of Fig. 3) when the oar is on the return and being feathered and unfeathered, and the last $y\ y$ for the arms of the tripping or guide wheel when the pinion is out of gear and the oar on stroke.

The guide-wheel $c''\ c''$, Fig. 4, may be nothing but a second equilateral, but the arrangement represented is better.

Second. A modification of this class, and an important one, which I have introduced dispenses with the pinion and racks, unites the guide-wheel to the equilateral, as the pinion is, adjusts it and its grooves $y$ and $y'$ where the pinion and racks are, and inserts dogs in its path, as in class third. Under this change the dogs trip the guide-wheel, and of course the equilateral, and do so as the latter is passing a slot, thus feathering, &c., as before. The guide in traversing its circuit throws the equilateral in and out of the line of its slots, as it did the pinion. In this modification of the second class of feathering-gear the screw for the end of the loom-lever $p\ p$ is again brought in requisition, for the equilateral is not keyed to the lever, but moves with the guide longitudinally on it, as did the pinion.

Third. Instead of a guide and two grooves for throwing the pinion or equilateral out or in gear, as the case may be, four screw-wings may be keyed on the loom-lever and operate against a pin at the point of the curved shoulders, thus obliquing the pinions.

The third class of feathering apparatus, and which is the preferred one, is presented in Fig. 3, and the view of the equilateral and guide adjacent. Here I dismiss all complications and bring forward a constituent which for simplicity and efficiency surpasses both the others. The pinion and racks are first rejected, then the grooves for the guide-wheel, which is adjusted near the equilateral and made, indeed, part of it, when that is not tasked with the duty of holding the loom-lever in its place. The dogs 5' and 6' for tripping the guide $c''$ $c''$ by its arms $d''$ $d''$ are represented as acting horizontally; but just as good an adjustment is obtained by placing them directly in the track of the arms and enabling them to act vertically.

GENERAL REMARKS.

I. *Carriage-way:* a. Each carriage-way is cast with or dovetailed in the frame and held by a set-screw. b. Each carriage-way is or may be made in two parts interlapping or scarfed together in such manner as to be capable of easy extension or contraction for an assigned distance. (*Note:* Dogways are not used when the carriage-way is divisible.) c. The points of contact with the frame are precisely equal in spite of the difference in width of the carriage-ways. Hence the way for each class of feathering-gear can be adjusted in the frame or removed from it without a change. All the ways fit respectively in the same frame, the apparent disparities in the drawings to the contrary notwithstanding.

II. *Equilateral:* a. In the first class dogs trip the equilateral and cause the feathering and unfeathering. b. In the second class the racks turn the pinion and cause the same results. c. In the third class the dogs again trip the guide (not equilateral) and cause the feathering and unfeathering. d. In each class the equilateral runs, or should run, in a rectangular groove having two slots, through which, respectively, it turns aside. e. In each class the equilateral holds, or may hold, the loom-lever $p$ $p$ in gear, the modification of the second excepted. f. In each class the equilateral's chief function is to preserve the blade at a true feather or unfeather and prevent any departures therefrom.

*Guide-wheel:* a. In the second class the wing-screw device for obliquing the pinion or equilateral may be frequently substituted. b. In the third class, if the screw-journal of the loom-lever be used, the equilateral and guide may consist of the consolidation of the square and circle—that is, the equilateral and guide may be united—thus and thereby reducing the size and weight of the carriage-way to an ounce or two.

*Manufacture:* What is regarded as the "Amateur" oar and bought and used as such are the following: The hinge, the frame, the four carriage-ways, the four tumblers, the seven sets of segments, (two cogged and five banded,) the two kinds of loom-levers, (with and without screw-journals,) and the blade described herein. These constitute the oar named the "Amateur" and give it its capabilities and functions.

The results obtained by these simple inventions in feathering are six, viz: First, that the feathering and unfeathering of the oar is reduced to a mechanical certainty; second, that no force except a breaking one, however applied, can feather the oar in stroke, or unfeather it when not; third, that any length of stroke can be taken which the rower desires; fourth, that the loom-arm revolves a quadrant at a time and half a revolution at a return; fifth, that, therefore, the wear of the journal of the loom-lever is uniform upon all sides equally; sixth, that the strain upon the blade is also face after face, thus preserving its rectitude.

To enable others skilled in the art to use also my invention, I proceed now to describe in the briefest manner its operation.

Assume the position of the loom-lever and the handle-lever to be that in which their axes form one right line, and in which the right hand has seized the handle at the center of the boat, the face to the bow and the oar at feather. Assume, also, that the circular segments are used as well as the first class of feathering apparatus, as seen in Fig. 1. Carry the handle-lever forward, as with a common oar, in the right hand to complete the return and to begin the stroke. Inasmuch as the movement of each lever is always necessarily in kind and plane the same, the loom-lever keeps pace with the handle-lever, arriving at the point on which the stroke should commence at the instant the latter does. The equilateral in passing the dogway 3 3 3 encounters the tooth 5 of the dog, is tripped forward a side and unfeathers the blade, thus giving it the position required for a stroke. By virtue of the compound functions of the hinge the lever, as with a common oar, is now carried up and the loom-lever down into the water, and the stroke begins, blade at right angles to the surface of the stream. As the hand draws the handle toward the body the blade is pressed along its work till the stroke is finished. As the blade rises from the water and starts on its return the equilateral encounters the tooth 6 of the other dog, is tripped forward a side, and thus feathers the blade. Such is the operation of the oar in rowing.

REMARKS.

First. The action of the handle-lever is to the oarsman propelling the boat precisely like that of the ordinary oar, and the moment he relieves himself of the idea that his back is toward the goal the charm of his natural though new relation is complete.

Second. The circular segments (represented in Fig. 1) should be six-sixteenths of a circle to allow the folding of the arms parallel with each other and alongside or in the boat. For rowing four-sixteenths or a quarter are large enough.

Third. To unship the oar, raise or depress either lever till the plane of the frame is perpendicular to the tangent of the curve of the slotted eyes of the hinge. Then lift in the direction of the plane, and the journals $e\ e$ escape from their slots $c'\ c'$, Fig. 2. To ship the oar, reverse the motion, but preserve the method.

Fourth. The starboard-oar is changed into the larboard (a) by reversing the dogs where these are used for tripping or feathering, &c.; (b) by substituting in second class of feathering apparatus the one shoulder for the other, and thus compelling the arms of the guide to oblique the pinion or equilateral the reverse of the method herein noted.

What I claim as my invention, and desire to secure by Letters Patent, is—

1. The hinge represented in Figs. 1 and 2, when constructed and operating substantially as described.

2. The frame $f f f$, supporting the carriage-way $g\ g\ g$ and preserving the two divisions of the loom in the same plane, as specified.

3. The loom as divided into two general levers with independent fulcra and as acting upon each other through the instrumentality of the segments attached, as and for the purpose set forth.

4. The third class of feathering apparatus as described in the specification and represented in Fig. 3 of the drawings.

5. Dividing the carriage-way into two parts, which are united by interlapping or scarfing, for the purpose set forth.

6. The hinge, the frame, and the divided loom, in combination with the third class of feathering apparatus and its divided carriage-way, all as and for the purposes specified.

THALES LINDSLEY.

Witnesses:
   CHS. T. CHURCH,
   CATHARINE PIERSON.